United States Patent
Kim et al.

(10) Patent No.: US 11,000,801 B2
(45) Date of Patent: May 11, 2021

(54) SYSTEM FOR DETECTING AN ABNORMALITY IN A CARBON DIOXIDE SEPARATION MEMBRANE PLANT

(71) Applicants: KOREA ELECTRIC POWER CORPORATION, Naju-si (KR); ARSTROMA CO., LTD., Daegu (KR); KOREA EAST-WEST POWER CO., LTD., Ulsan (KR); KOREA SOUTH-EAST POWER CO., LTD., Jinju-si (KR); KOREA WESTERN POWER CO., LTD., Taean-gun (KR)

(72) Inventors: Dong Sub Kim, Seongnam-si (KR); Jung Bin Lee, Daejeon (KR); Joong Won Lee, Daejeon (KR); Ky Yeong Shin, Daegu (KR); Gwan Shig Kim, Pohang-si (KR)

(73) Assignees: KOREA ELECTRIC POWER CORPORATION, Naju-si (KR); ARSTROMA CO., LTD., Daegu (KR); KOREA EAST-WEST POWER CO., LTD., Ulsan (KR); KOREA SOUTH-EAST POWER CO., LTD., Jinju-si (KR); KOREA WESTERN POWER CO., LTD., Taean-gun (KR)

( * ) Notice: Subject to any disclaimer, the term of this patent is extended or adjusted under 35 U.S.C. 154(b) by 286 days.

(21) Appl. No.: 16/316,558

(22) PCT Filed: Jan. 5, 2018

(86) PCT No.: PCT/KR2018/000284
§ 371 (c)(1),
(2) Date: Jan. 9, 2019

(87) PCT Pub. No.: WO2019/022322
PCT Pub. Date: Jan. 31, 2019

(65) Prior Publication Data
US 2019/0366264 A1  Dec. 5, 2019

(30) Foreign Application Priority Data

Jul. 28, 2017 (KR) .................. 10-2017-0096181

(51) Int. Cl.
   *B01D 53/22*   (2006.01)
   *B01D 65/10*   (2006.01)
   *G01N 15/08*   (2006.01)

(52) U.S. Cl.
   CPC .......... *B01D 53/228* (2013.01); *B01D 65/10* (2013.01); *G01N 2015/084* (2013.01)

(58) Field of Classification Search
   CPC . B01D 53/228; B01D 65/10; G01N 2015/084
   See application file for complete search history.

(56) References Cited

U.S. PATENT DOCUMENTS 5,053,058 A * 10/1991 Mitariten ............... B01D 53/22
                                                                95/8
5,064,446 A * 11/1991 Kusuki ............... C01B 23/0047
                                                                95/53
(Continued)

FOREIGN PATENT DOCUMENTS

JP  2003-053162 A  2/2003
JP  2011-072958 A  4/2011
(Continued)

OTHER PUBLICATIONS

Machine Translation of WO 2016122067 Which Originally Published on Aug. 4, 2016. (Year: 2016).*
(Continued)

*Primary Examiner* — David A. Rogers
(74) *Attorney, Agent, or Firm* — Foundation Law Group, LLP

(57) ABSTRACT

A carbon dioxide ($CO_2$) separation membrane plant abnormality detection system includes: an entrance unit through which gas containing $CO_2$ enters a plant including a $CO_2$
(Continued)

separation membrane module; a separation membrane module; a permeation unit configured to discharge the gas with the relatively high $CO_2$ concentration, which is discharged from the separation membrane module, to the outside of the plant; a residue unit configured to discharge the gas with the relatively low $CO_2$ concentration, which is discharged from the separation membrane module, to the outside of the plant; a measurer configured to measure information; and a controller configured to determine the presence of an abnormality, wherein the controller determines whether the plant is in an abnormal situation.

13 Claims, 6 Drawing Sheets

(56) References Cited

U.S. PATENT DOCUMENTS

| | | | | |
|---|---|---|---|---|
| 5,281,253 | A * | 1/1994 | Thompson | B01D 53/226 95/22 |
| 5,354,474 | A * | 10/1994 | Lapack | B01D 53/22 210/637 |
| 5,383,956 | A * | 1/1995 | Prasad | B01D 53/268 95/45 |
| 5,709,732 | A * | 1/1998 | Prasad | B01D 53/226 95/45 |
| 8,845,784 | B2 * | 9/2014 | Huang | B01D 71/024 95/44 |
| 9,770,687 | B2 * | 9/2017 | Ungerank | B01D 53/22 |
| 10,376,833 | B2 * | 8/2019 | Sengupta | B01D 53/62 |
| 10,821,405 | B2 * | 11/2020 | Lee | G01M 99/00 |
| 2004/0045432 | A1 * | 3/2004 | Yamamoto | B01D 63/02 95/48 |
| 2010/0313750 | A1 * | 12/2010 | Sanders, Jr. | B01D 63/00 95/39 |
| 2011/0077446 | A1 * | 3/2011 | Shanbhag | B01D 53/72 585/818 |
| 2013/0098242 | A1 * | 4/2013 | Ungerank | B01D 53/226 95/51 |
| 2014/0360226 | A1 * | 12/2014 | Yoo | F25J 1/0027 62/606 |
| 2015/0336046 | A1 | 11/2015 | Ungerank et al. | |
| 2018/0169574 | A1 * | 6/2018 | Sengupta | B01D 53/62 |
| 2018/0328278 | A1 * | 11/2018 | Nemitallah | F23R 3/286 |
| 2020/0276542 | A1 * | 9/2020 | Chu | B01D 69/145 |
| 2020/0346171 | A1 * | 11/2020 | Noda | B01D 69/10 |

FOREIGN PATENT DOCUMENTS

| | | | | |
|---|---|---|---|---|
| JP | 2014-159543 | A | | 9/2014 |
| KR | 20130064324 | A | * | 6/2013 |
| KR | 101322709 | B1 | * | 10/2013 |
| KR | 10-2015-0083855 | A | | 7/2015 |
| WO | 91/11913 | A1 | | 8/1991 |
| WO | 2014-075850 | A1 | | 5/2014 |
| WO | WO-2016122067 | A1 | * | 8/2016 ............ B01D 65/10 |
| WO | WO-2019147007 | A1 | * | 8/2019 |

OTHER PUBLICATIONS

Colin A. Scholes, Carbon Dioxide (CO2) Separation by Membranes, Encyclopedia of Membranes, 2015. (Year: 2015).*

Gang Xu et al., An Improved CO2 Separation and Purification System Based on Cryogenic Separation and Distillation Theory, Energies, vol. 7, May 23, 2014. (Year: 2014).*

Mohammad Songolzadeh et al., Carbon Dioxide Separation from Flue Gases: A Technological Review Emphasizing Reduction in Greenhouse Gas Emissions, The Scientific World Journal, vol. 2014, Article ID 828131, Feb. 17, 2014. (Year: 2014).*

Communication from Philippine Patent office for Office Action dated Nov. 25, 2020 in the corresponding Philippine Patent Application No. 1-2019-500057 which corresponds to the present application.

* cited by examiner

[FIG.1]
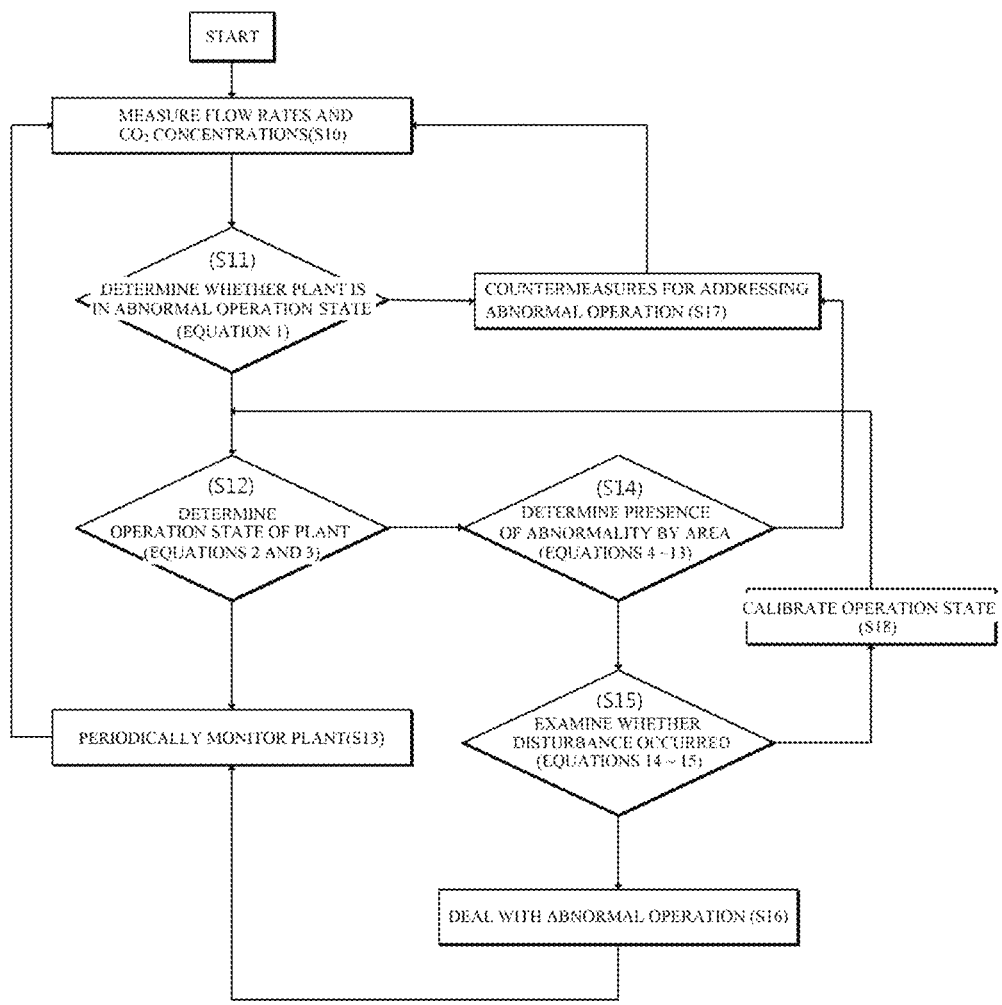

[FIG.2]
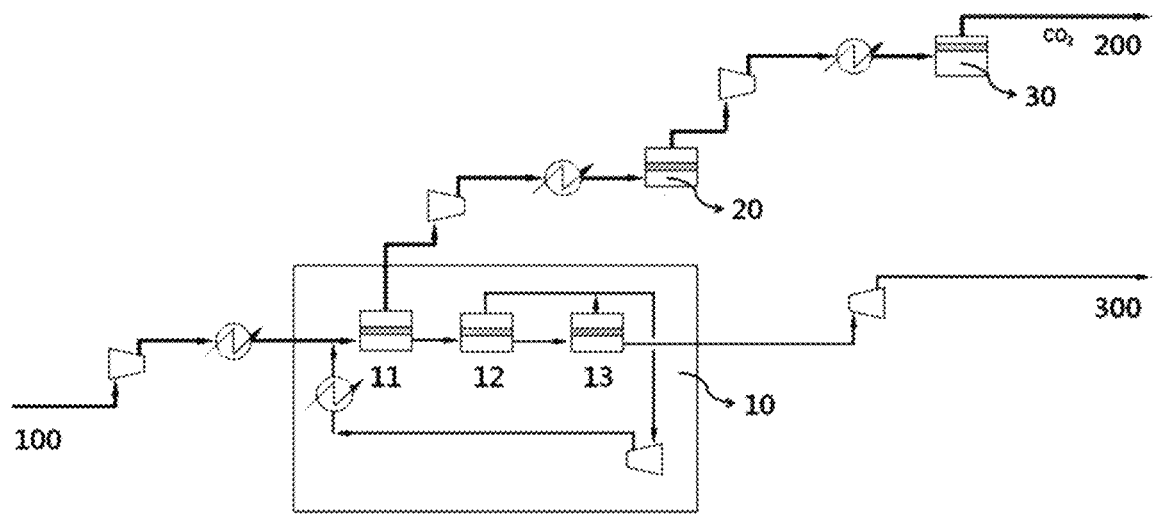
[FIG.3]
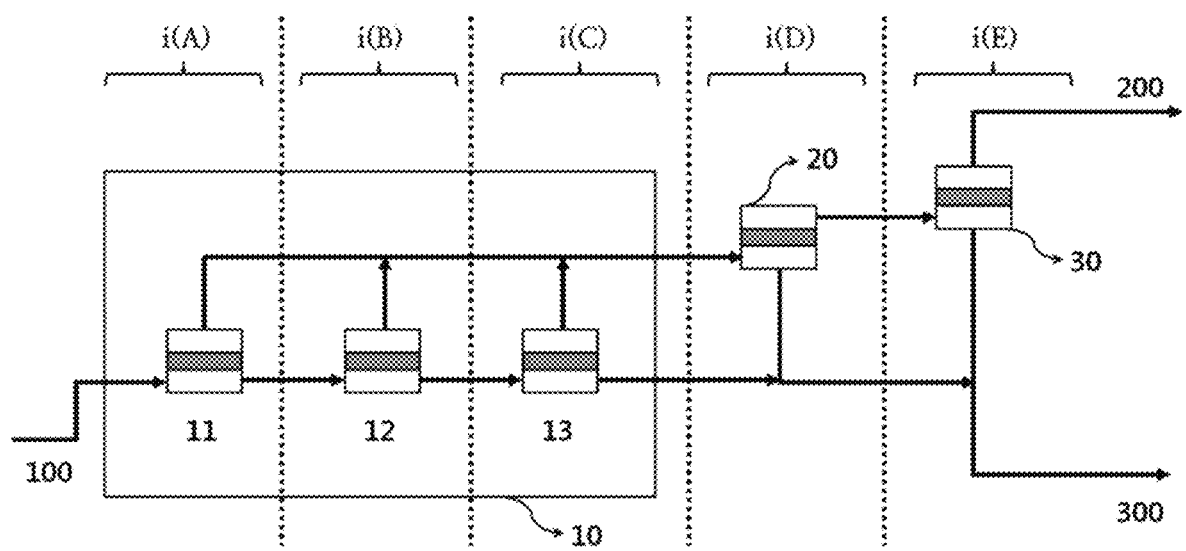

[FIG.4]
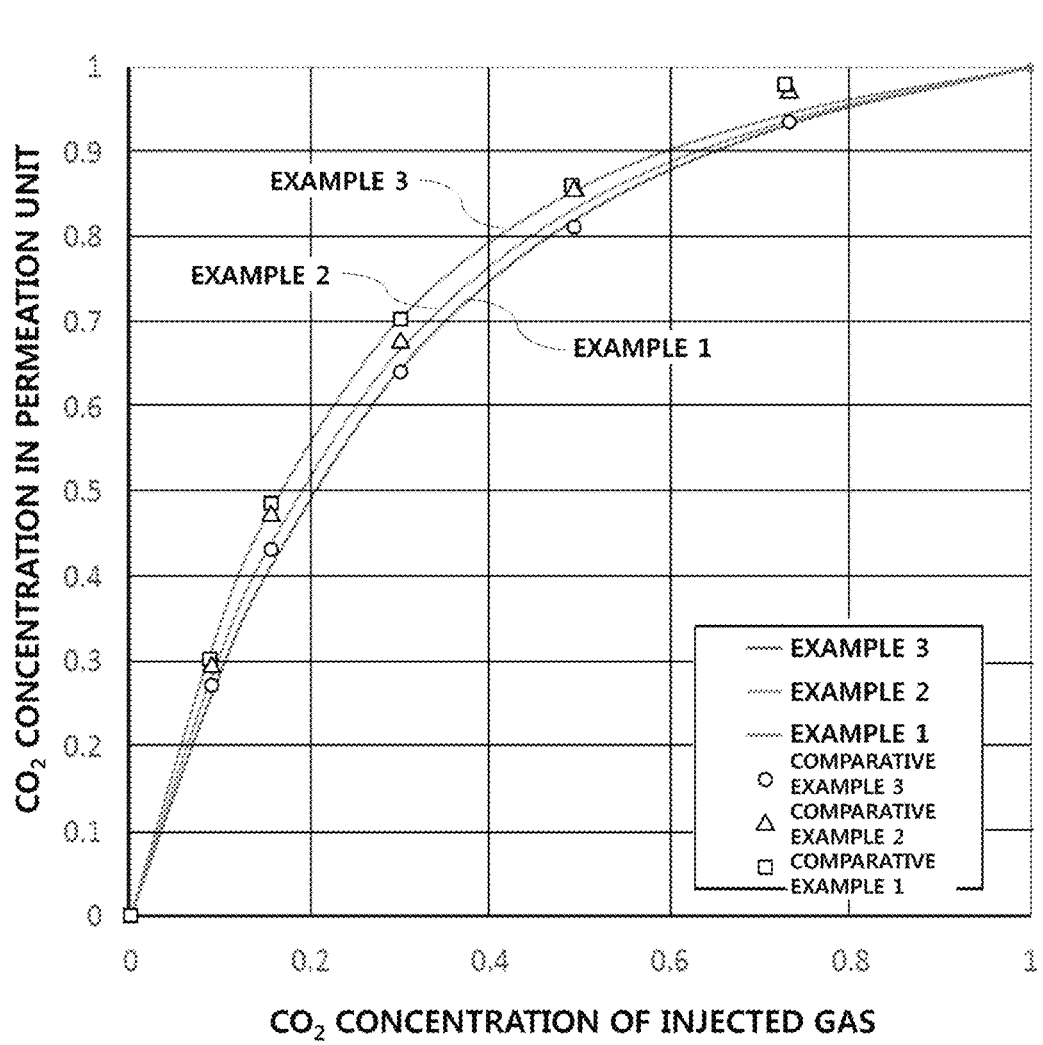

[FIG.5]
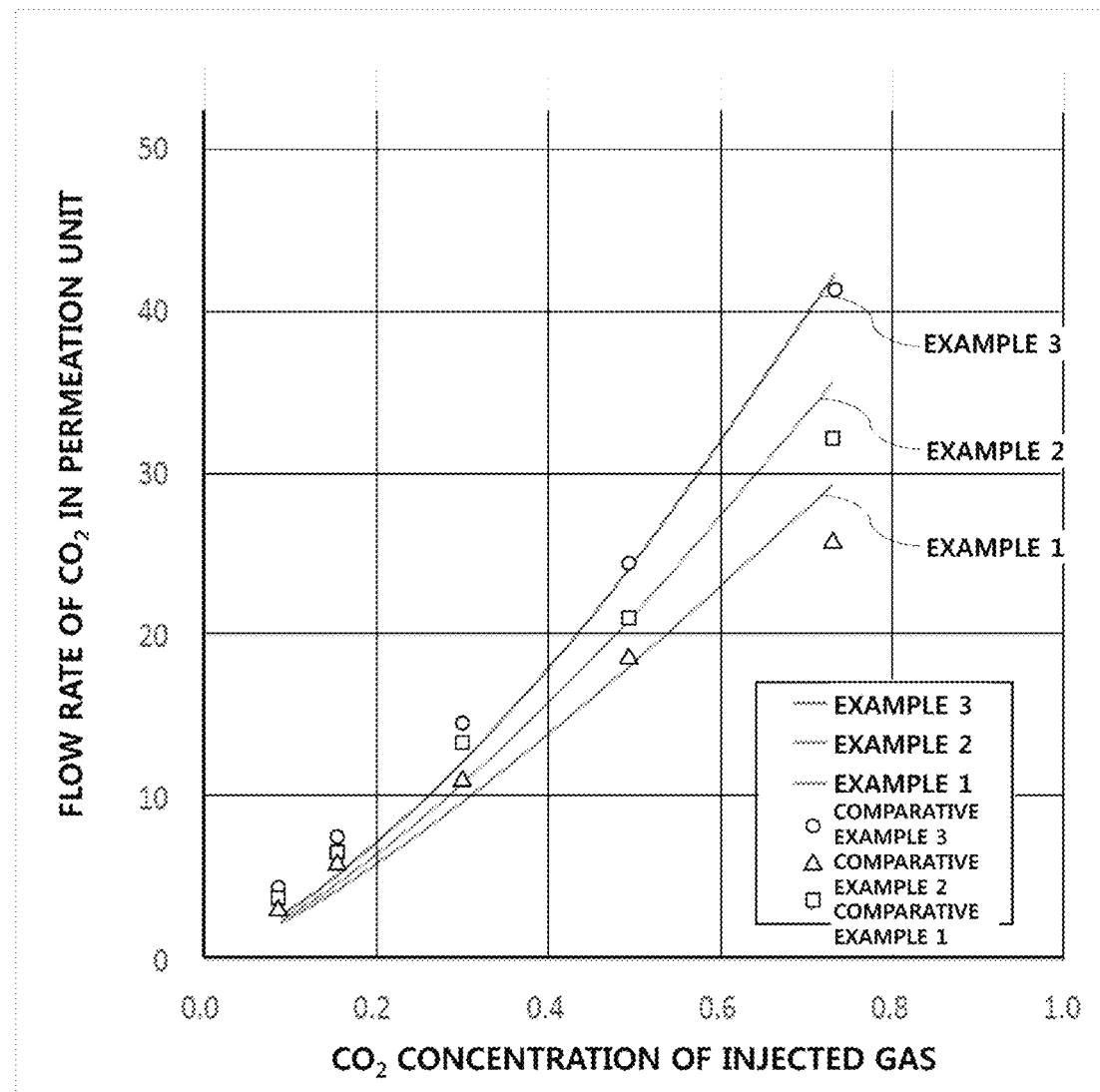

[FIG.6]
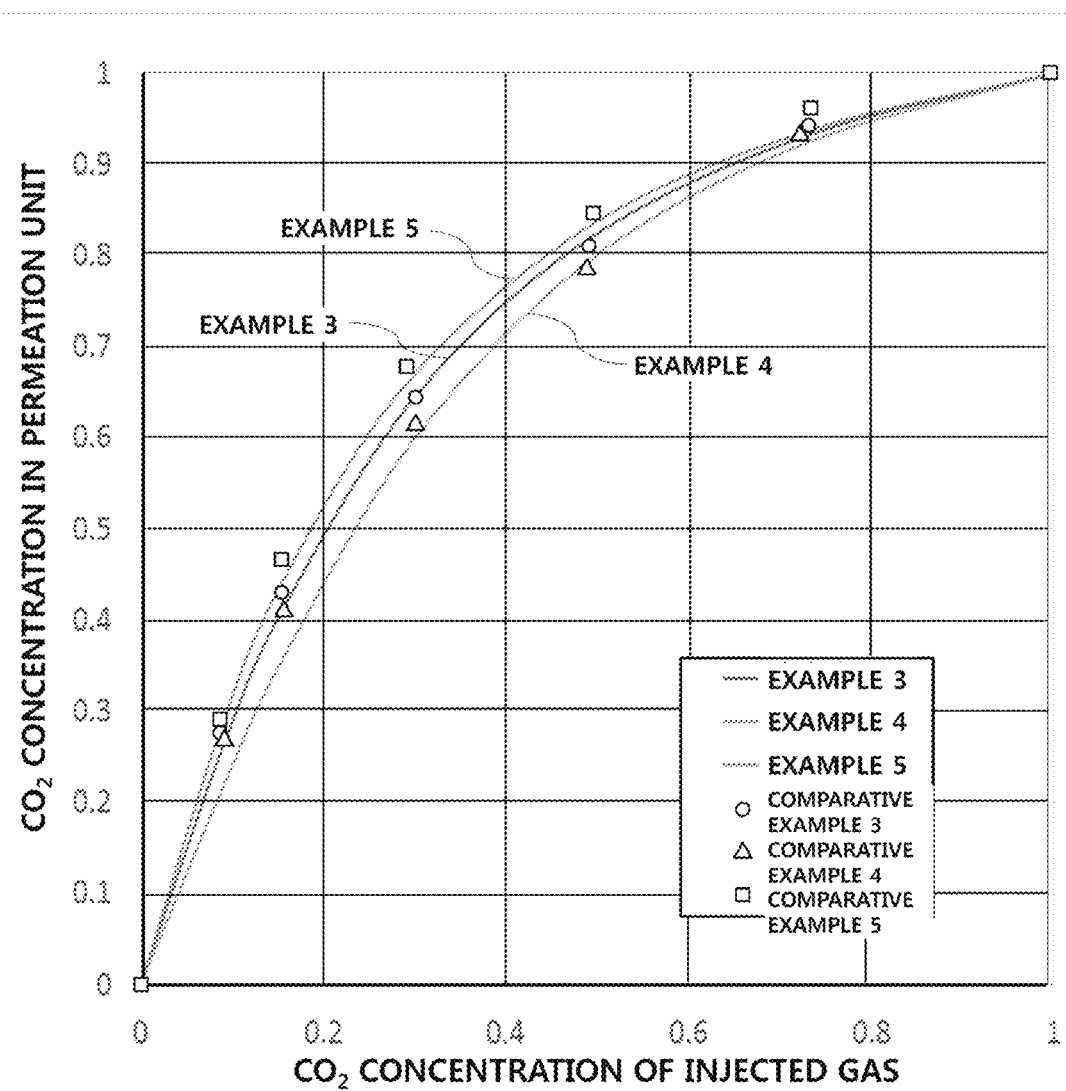

[FIG.7]
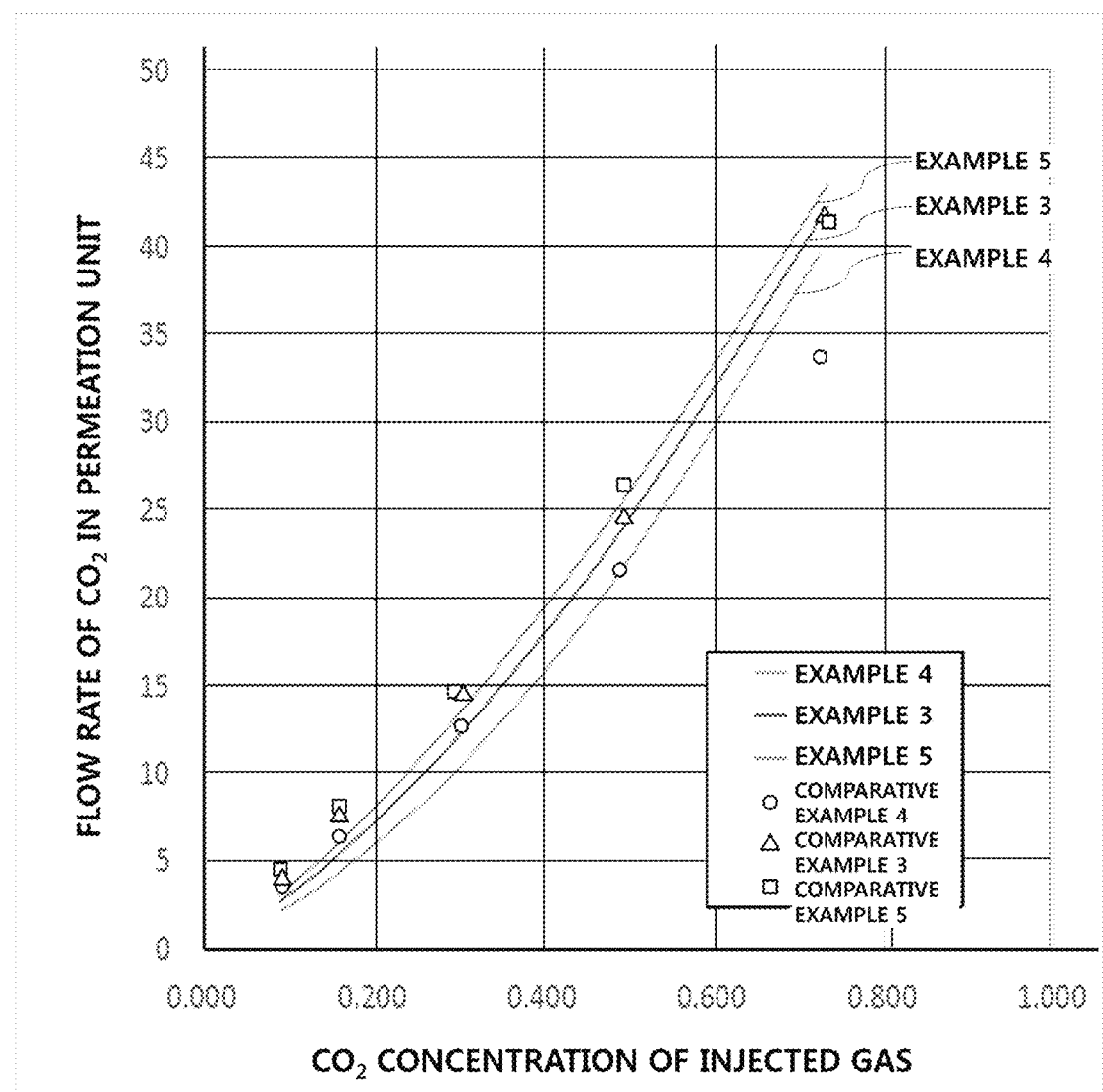

SYSTEM FOR DETECTING AN ABNORMALITY IN A CARBON DIOXIDE SEPARATION MEMBRANE PLANT

CROSS REFERENCE TO RELATED PATENT APPLICATIONS

This application claims the benefit under 35 U.S.C. Section 371, of PCT International Application No. PCT/KR2018/000284, filed on Jan. 5, 2018, which claimed priority to Korean Patent Application No. 10-2017-0096181 filed on Jul. 28, 2017, the disclosures of which are hereby incorporated by the references.

TECHNICAL FIELD

The present invention relates to a carbon dioxide ($CO_2$) separation membrane plant abnormality detection system.

BACKGROUND ART

Efforts are being made worldwide to reduce carbon dioxide ($CO_2$) emissions to reduce the rapid climate change caused by global warming. Accordingly, there is a growing demand for carbon capture and sequestration (CCS) technology that can capture $CO_2$ from exhaust gas generated by burning fossil fuels.

Conventional CCS technologies include an absorption technique in which exhaust gas is brought into contact with a chemical $CO_2$ absorbent such as amine, ammonia, or potassium carbonate, an adsorption technique, such as pressure swing adsorption (PSA) and temperature swing adsorption (TSA) in which exhaust gas is caused to pass through an adsorbent using a difference in temperature or pressure, and a cryogenic technique in which target gas is selectively cooled and condensed using a difference in vapor pressure according to the gas species. However, such conventional CCS technologies have high energy consumption and have clear limitations in terms of the processing capacity or facility repair.

One of the newly developed CCS technologies is the $CO_2$ separation membrane plant, which is capable of separating $CO_2$ from exhaust gas generated from coal-fired power plants at low cost and high efficiency. The $CO_2$ separation membrane separates and captures $CO_2$ in the exhaust gas using a difference in size of gas molecules contained in the exhaust gas, a difference in permeation rate, and a difference in polarity of separation membrane modules.

Generally, the $CO_2$ separation membrane plant uses a module unit which combines a separation membrane material with a support body or the like in an internal pressure vessel, causes injected gas to pass therethrough, captures $CO_2$, and then discharges $CO_2$ and the filtered gas. The $CO_2$ separation membrane plant may expand facility and processing capacity in a relatively easy way by increasing the number of separation membranes or modules according to operation conditions and separation performance goals.

In addition, the $CO_2$ separation membrane plant has advantages in that it is highly efficient in terms of energy because it does not involve phase change in the $CO_2$ separation process, it is environmentally friendly because it does not emit harmful substances in the air and does not discharge wastewater, it is relatively easy to install a device and facility therefor because it is in the form of a module, and it is possible to expand its application, beyond the $CO_2$ capture process, to other gas capture technical fields such as the gas refining field.

However, since the $CO_2$ separation membrane plant is a relatively recently introduced technology, there are not many cases of application and commercialization of the $CO_2$ separation membrane plant in actual power plants. Accordingly, there is a great need for continuous research and technology development for an efficient operation of the $CO_2$ separation membrane plant.

As an example, in similar technical fields such as a water treatment separation membrane and a methane/nitrogen gas separation membrane which have already been commercialized, since, in order to derive suitable operation conditions according to performance of an installed separation membrane, a plant has to be test-operated and then result values have to be changed while being continuously monitored on site, there are problems in that there is an inconvenience of having to undergo many trials and errors, it is difficult to predict whether an abnormality will occur in the plant according to a change in an operation condition, and it is difficult to accurately check a spot or a time point at which an abnormal situation has occurred.

In addition, in the case of the $CO_2$ separation membrane plant, since a response speed is higher as compared with those in the similar technical fields, it is important to rapidly detect or predict an abnormality in the separation membrane.

Therefore, in relation to a method of operating the $CO_2$ separation membrane plant, there is a growing need for developing a method capable of detecting or predicting an abnormality so that abnormalities such as a time point at which an operation method should be changed, whether it is necessary to clean the separation membrane, and whether a separation membrane module is damaged and needs to be replaced are detected.

DISCLOSURE

Technical Problem

One aspect of the present invention provides a carbon dioxide ($CO_2$) separation membrane plant abnormality detection system capable of accurately checking an area of the $CO_2$ separation membrane plant in which an abnormal situation has occurred or a time point at which the abnormal situation has occurred so that it is possible to rapidly detect suitability of an operation at the time of changing an operation method, rapidly detect whether it is necessary to clean the separation membrane, and rapidly detect a period of time in which a damaged module should be replaced.

Technical Solution

An embodiment of the present invention relates to a carbon dioxide ($CO_2$) separation membrane plant abnormality detection system including: an entrance unit through which gas containing $CO_2$ enters a plant including a $CO_2$ separation membrane module; a separation membrane module which includes an injection port supplying the gas containing $CO_2$ to each $CO_2$ separation membrane module and is configured to cause the supplied gas to permeate through the $CO_2$ separation membrane and separately discharge gas with a relatively high $CO_2$ concentration that has permeated through the separation membrane to a first discharge port and gas with a relatively low $CO_2$ concentration that has failed to permeate through the separation membrane to a second discharge port; a permeation unit configured to discharge the gas with the relatively high $CO_2$ concentration, which is discharged from the separation membrane module, to the outside of the plant; a residue unit configured to discharge the gas with the relatively low $CO_2$ concentration, which is discharged from the separation membrane module, to the outside of the plant; a measurer configured to measure information including a flow rate, a $CO_2$ concentration, and a pressure in the entrance unit, the permeation unit, and the residue unit; and a controller configured to determine the presence of an abnormality from the information collected by the measurer, wherein, when a first reference value calculated using Equation 1 below is about less than 95%, the controller detects an operation situation of the plant as an abnormal situation, and, when the first reference value calculated using Equation 1 is about 95% or higher, the controller calculates a second reference value and a third reference value from Equations 2 and 3 below to determine an operation state of the plant:

$$\text{First reference value} = [\{(Q_P \times C_{P.CO2}) \pm (Q_R \times C_{R.CO2})\} / (Q_{IN} \times C_{IN.CO2})] \times 100 \quad \text{[Equation 1]}$$

$$\text{Second reference value} = |J - \{(Q_P \times C_{P.CO2}) / (Q_{IN} \times C_{IN.CO2}) \times 100\}| \quad \text{[Equation 2]}$$

$$\text{Third reference value} = |K - C_{P.CO2}|, \quad \text{[Equation 3]}$$

wherein, in Equations 1 to 3:

$Q_{IN}$ represents a flow rate ($Nm^3/hr$) of the gas containing $CO_2$ that enters the plant through the entrance unit;

$Q_P$ represents a flow rate ($Nm^3/hr$) of the gas discharged to the permeation unit;

$Q_R$ represents a flow rate ($Nm^3/hr$) of the gas discharged to the residue unit;

$C_{IN.CO2}$ represents a $CO_2$ concentration (vol %) in the entrance unit;

$C_{P.CO2}$ represents a $CO_2$ concentration (vol %) of the gas discharged to the permeation unit;

$C_{R.CO2}$ represents a $CO_2$ concentration (vol %) of the gas discharged to the residue unit;

J represents a target $CO_2$ capture rate (%); and

K represents a target $CO_2$ concentration (vol %).

Advantageous Effects

The present invention can provide a carbon dioxide ($CO_2$) separation membrane plant abnormality detection system capable of accurately checking an area of the $CO_2$ separation membrane plant in which an abnormal situation has occurred or a time point at which the abnormal situation has occurred so that it is possible to rapidly detect suitability of an operation at the time of changing an operation method, rapidly detect whether it is necessary to clean the separation membrane, and rapidly detect a period of time in which a damaged module should be replaced.

DESCRIPTION OF DRAWINGS

FIG. 1 illustrates a illustratively flowchart of a carbon dioxide ($CO_2$) separation membrane plant abnormality detection system according to an embodiment of the present invention.

FIG. 2 illustrates a illustratively $CO_2$ separation membrane plant according to an embodiment of the present invention.

FIG. 3 illustrates illustratively sections (devined areas) of the $CO_2$ separation membrane plant according to an embodiment of the present invention.

FIG. 4 is a graph showing results of predicting, by the $CO_2$ separation membrane plant abnormality detection system, change values in a $CO_2$ concentration in a permeation unit when a pressure is changed according to an embodiment of the present invention.

FIG. 5 is a graph showing results of predicting, by the $CO_2$ separation membrane plant abnormality detection system, change values in a $CO_2$ flow rate in the permeation unit when the pressure is changed according to an embodiment of the present invention.

FIG. 6 is a graph showing results of predicting, by the $CO_2$ separation membrane plant abnormality detection system, change values in a $CO_2$ concentration in the permeation unit when a flow rate is changed according to an embodiment of the present invention.

FIG. 7 is a graph showing results of predicting, by the $CO_2$ separation membrane plant abnormality detection system, change values in a $CO_2$ flow rate in the permeation unit when a flow rate is changed according to an embodiment of the present invention.

BEST MODE OF THE INVENTION

An embodiment of the present invention relates to a carbon dioxide ($CO_2$) separation membrane plant abnormality detection system including: an entrance unit through which gas containing $CO_2$ enters a plant including a $CO_2$ separation membrane module; a separation membrane module which includes an injection port supplying the gas containing $CO_2$ to each $CO_2$ separation membrane module and is configured to cause the supplied gas to permeate through the $CO_2$ separation membrane and separately discharge gas with a relatively high $CO_2$ concentration that has permeated through the separation membrane to a first discharge port and gas with a relatively low $CO_2$ concentration that has failed to permeate through the separation membrane to a second discharge port; a permeation unit configured to discharge the gas with the relatively high $CO_2$ concentration, which is discharged from the separation membrane module, to the outside of the plant; a residue unit configured to discharge the gas with the relatively low $CO_2$ concentration, which is discharged from the separation membrane module, to the outside of the plant; a measurer configured to measure information including a flow rate, a $CO_2$ concentration, and a pressure in the entrance unit, the permeation unit, and the residue unit; and a controller configured to determine the presence of an abnormality from the information collected by the measurer, wherein, when a first reference value calculated using Equation 1 of the present invention is about less than 95%, the controller detects an operation situation of the plant as an abnormal situation, and, when the first reference value calculated using Equation 1 is about 95% or higher, the controller calculates a second reference value and a third reference value from Equations 2 and 3 of the present invention to determine an operation state of the plant.

In this way, the present invention may accurately check an area of the $CO_2$ separation membrane plant in which an abnormal situation has occurred or a time point at which the abnormal situation has occurred so that it is possible to rapidly detect suitability of an operation at the time of changing an operation method, rapidly detect whether it is necessary to clean the separation membrane, and rapidly detect a period of time in which a damaged module should be replaced.

For example, the $CO_2$ separation membrane plant abnormality detection system of the present invention may be applied to a $CO_2$ separation membrane plant including a flat panel type separation membrane module. In such a case, the effect of applying the abnormality detection method may be further enhanced.

FIG. 2 illustrates a $CO_2$ separation membrane plant including an illustrative separation membrane module to which the present invention may be applied. Referring to FIG. 2, exhaust gas containing $CO_2$ that is discharged from a boiler of a coal-fired power plant facility or the like enters the plant via an entrance unit 100 and then is supplied, via an injection port of a first module 10 along a pipe, to the module and a separation membrane inside the module. In this case, $CO_2$ separation membrane modules 10, 20, and 30 may include two or more unit modules 11, 12, and 13 like the first module 10 illustrated in FIG. 2 or may be modules each formed of a single unit module like a second module 20 and a third module 30 illustrated in FIG. 2. As illustrated in FIG. 2, the gas containing $CO_2$ that is injected via the entrance unit 100 is separated into gas with a relatively high $CO_2$ concentration and gas with a relatively low $CO_2$ concentration through the first module to the third module. In this case, the gas with the relatively high $CO_2$ concentration (captured $CO_2$ gas) that is finally discharged to a permeation unit of the plant may include $CO_2$ at, for example, a purity of about 80% or higher, a purity of about 90% or higher, or a purity of about 96% or higher (or a concentration of about 80 vol % or higher, a concentration of about 90 vol % or higher, or a concentration of about 96 vol % or higher), and the gas may be discharged, via a permeation unit 200, to a processing device, a storage device, or the like outside the plant. Also, the gas with the relatively low $CO_2$ concentration that is finally separated in the plant may be discharged to the outside via a residue unit 300, which is separately formed from the permeation unit 200, or may be re-supplied (circulated) to the first module to the third module via the injection port. In this case, the plant may set a target $CO_2$ concentration K of the permeation unit to, for example, about 90 vol % or higher or about 96 vol % or higher, may set a target $CO_2$ capture rate J of the permeation unit to, for example, about 90 vol % or higher or about 96 vol % or higher, and may input such set values to the system and utilize the input set values in determining the presence of an abnormality in an operation using Equations 1 to 3.

The order and configuration of condensers and coolers illustrated in FIG. 2 may be freely changed and are not limited to those illustrated in FIG. 2. The configuration of the plant is not limited to that illustrated in FIG. 2. The plant may be arranged in various ways such that energy consumption is minimized in consideration of the optimal arrangement of separation membrane modules and recycling in the process and a target $CO_2$ capture rate and a target $CO_2$ concentration are achieved.

The $CO_2$ separation membrane plant abnormality detection system of the present invention includes a measurer (not illustrated) configured to measure information including a flow rate, a $CO_2$ concentration, and a pressure in the entrance unit 100, the permeation unit 200, and the residue unit 300 and a controller (not illustrated) configured to determine the presence of an abnormality from the information collected by the measurer.

When a first reference value calculated using Equation 1 below is about less than 95%, the controller detects an operation situation of the plant as an abnormal situation. In such a case, the system may address the abnormal situation by performing an operation checking whether a leak has occurred in a pipe of the plant and checking whether the plant has reached a normal state.

$$\text{First reference value} = [\{(Q_P \times C_{P.CO2}) \pm (Q_R \times C_{R.CO2})\} / (Q_{IN} \times C_{IN.CO2})] \times 100 \quad \text{[Equation 1]}$$

In Equation 1, $Q_{IN}$ represents a flow rate ($Nm^3/hr$) of the gas containing $CO_2$ that enters the plant through the entrance unit; $Q_P$ represents a flow rate ($Nm^3/hr$) of the gas discharged to the permeation unit; $Q_R$ represents a flow rate ($Nm^3/hr$) of the gas discharged to the residue unit; $C_{IN.CO2}$ represents a $CO_2$ concentration (vol %) in the entrance unit; $C_{P.CO2}$ represents a $CO_2$ concentration (vol %) of the gas discharged to the permeation unit; and $C_{R.CO2}$ represents a $CO_2$ concentration (vol %) of the gas discharged to the residue unit.

Each of the flow rates and $CO_2$ concentrations may be measured by a measurer disposed in an area where the corresponding factor is measured (e.g., the entrance unit, the permeation unit, or the residue unit).

When the first reference value calculated using Equation 1 is about 95% or higher, the controller calculates a second reference value and a third reference value from Equations 2 and 3 below to determine an operation state of the plant.

$$\text{Second reference value} = |J - (Q_P \times C_{P.CO2})/(Q_{IN} C_{IN.CO2}) \times 100| \quad \text{[Equation 2]}$$

$$\text{Third reference value} = |K - C_{P.CO2}| \quad \text{[Equation 3]}$$

In Equations 2 and 3, $Q_{IN}$, $Q_P$, $Q_R$, $C_{IN.CO2}$, $C_{P.CO2}$, and $C_{R.CO2}$ are the same as described above, J represents a target $CO_2$ capture rate (%), and K represents a target $CO_2$ concentration (vol %).

The target $CO_2$ capture rate (J) and the target $CO_2$ concentration (K) are values set by the user as plant operation goals and are not limited to the above. For example, the target $CO_2$ capture rate (%) may be set to about 90% or higher, about 95% or higher, about 96% or higher, or about 99% or higher, and the target $CO_2$ concentration (vol %) may be set to about 90 vol % or higher, about 95 vol % or higher, about 96 vol % or higher, or about 99 vol % or higher.

When the first reference value calculated using Equation 1 is 95% or higher while both the second reference value calculated using Equation 2 and the third reference value calculated using Equation 3 are less than or equal to set values designated by the user, the controller may determine that the $CO_2$ separation membrane plant is in normal operation. In such a case, the $CO_2$ separation membrane plant abnormality detection system may periodically monitor the $CO_2$ separation membrane plant by re-calculating the first to third reference values at predetermined time intervals. The re-calculation time interval may be set differently according to the user's determination. For example, the re-calculation time interval may be a time interval of about five minutes to about thirty minutes, but is not limited thereto.

When the first reference value calculated using Equation 1 is about less than 95% while one or more of the second reference value calculated using Equation 2 and the third reference value calculated using Equation 3 exceed set values designated by the user, the controller may determine an operation state of the plant as an abnormal situation. In this way, the presence of an abnormality in an operation may be rapidly detected, and, as will be described below, the second reference value and the third reference value may be utilized in materializing countermeasures for addressing the abnormal operation.

The abnormal operation detection using the second reference value and the abnormal operation detection using the third reference value may be performed simultaneously or sequentially. In this case, the order of the detections is not limited.

The set values designated by the user refer to values arbitrarily set by the user corresponding to an actual operation state. The plant operation may be more precisely performed as the set values designated by the user become smaller. However, when the detection and determination of the presence of an abnormality are sensitively performed, the system operation efficiency may be lowered. Accordingly, the set values designated by the user may be, specifically, about 10% or less, and more specifically, about 5% or less, e.g., 10%, 9%, 8%, 7%, 6%, 5%, 4%, 3%, 2%, and 1%. When the set values designated by the user are within the above range, the system operation efficiency may be improved.

When one or more of the second reference value calculated using Equation 2 and the third reference value calculated using Equation 3 exceed set values designated by the user, the controller may divide the whole plant into two or more areas and then calculate a fourth reference value, which is based on Equation 4 of the present invention, for each area to determine whether an abnormal situation has occurred by area.

In a specific example, when the first reference value is less than about 95%, the $CO_2$ separation membrane plant abnormality detection system may omit the process of calculating the second reference value and the third reference value and then immediately perform countermeasures for addressing the abnormal operation. In this case, appropriate countermeasures may be detecting and repairing a leakage site of the entire pipe included in the plant and checking whether the plant has reached a normal state, but are not limited thereto.

In another specific example, when the first reference value is about 95% or higher, the $CO_2$ separation membrane plant abnormality detection system may sequentially perform the processes of calculating the second reference value and the third reference value and detecting an abnormal operation. In this case, when both the second reference value calculated using Equation 2 and the third reference value calculated using Equation 3 are less than or equal to set values designated by the user, the $CO_2$ separation membrane plant abnormality detection system may determine an operation state of the plant as normal and re-calculate the first reference value at an interval of about five minutes to thirty minutes.

In still another example, when the first reference value is about 95% or higher and one or more of the second reference value and the third reference value exceed set values designated by the user, the $CO_2$ separation membrane plant abnormality detection system may determine an operation state of the plant as abnormal, divide the whole plant into two or more areas, and then determine whether an abnormal situation has occurred by each area.

In order to determine whether an abnormal situation has occurred by area, the $CO_2$ separation membrane plant abnormality detection system divides the plant into two or more areas. The standard for dividing the plant is not particularly limited and may be performed in units advantageous for detecting an abnormal operation. For example, as described above with reference to FIG. 2, the plant may be set to be divided into sections (devined areas) each including one of the first module 10, the second module 20, and the third module 30, or when, like the first module 10, a single module includes two or more unit modules, the plant may be set to be divided into sections each including a first-first module 11, a first-second module 12, and a first-third module 13.

FIG. 3 illustrates sections of the $CO_2$ separation membrane plant according to an embodiment of the present invention. Hereinafter, for convenience of description, for each area, a pipe which supplies gas containing $CO_2$ to the corresponding area will be referred to as an injection line, a pipe which discharges gas with a relatively high $CO_2$ concentration that has permeated through the separation membrane of the corresponding area will be referred to as a permeation line, and a pipe which discharges gas with a relatively low $CO_2$ concentration that has failed to permeate through the separation membrane of the corresponding area will be referred to a passage line. Also, the divided areas will be indicated as areas to be measured (i) below.

Referring to FIG. 3, an illustrative $CO_2$ separation membrane plant may be formed of a first module 10, a second module 20, and a third module 30. The first module 10 may be a multi-stage module formed of unit modules including a first-first module 11, a first-second module 12, and a first-third module 13, and each of the second module 20 and the third module 30 may be a single-stage module formed of a single unit module. In this case, as an example, the plant may be divided such that each area includes a single unit module. When the plant is divided into two or more areas in this way, an area i(A) may be set to include the first-first module 11, an area i(B) may be set to include the first-second module 12, an area i(C) may be set to include the first-third module 13, an area i(D) may be set to include the second module 20, and an area i(E) may be set to include the third module 30, respectively.

After the plant is divided into two or more areas in this way, a fourth reference value, which is based on Equation 4, may be calculated for each area to determine whether an abnormal situation has occurred by area. When determining whether an abnormal situation has occurred by area, the $CO_2$ separation membrane plant abnormality detection system may measure a flow rate, a $CO_2$ concentration, and a pressure from the injection line, the permeation line, and the passage line of each area and use the measured flow rates, $CO_2$ concentrations, and pressures in calculating the fourth reference value.

$$\text{Fourth reference value} = \{|(C_{PV,i} - C_{P.CO2,i})|/C_{P.CO2,i}\} \quad \text{[Equation 4]}$$

In Equation 4, $C_{PV,i}$ represents a $CO_2$ concentration (vol %) measured in the permeation line of the area to be measured (i), and $C_{P.CO2,i}$ represents a predicted value of a $CO_2$ concentration in the permeation line of the area to be measured that is calculated using Equation 5 below.

$$C_{P.CO2,i} = A \times C_{M.CO2,i} + B - \{D \times (C_{M.CO2,i})^2 + E \times C_{M.CO2,i} + F\}^{0.5} \quad \text{[Equation 5]}$$

In Equation 5, $C_{M.CO2,i}$ represents an average $CO_2$ concentration (vol %) on a surface of a separation membrane in the area to be measured (i), and A, B, D, E, and F are constants calculated by Equations 6 to 10 below.

$$A = P/2 \quad \text{[Equation 6]}$$

$$B = (S+P-1)/\{2 \times (S-1)\} \quad \text{[Equation 7]}$$

$$D = P^2/4 \quad \text{[Equation 8]}$$

$$E = \{P \times (S-P+1)\}/\{2 \times (1-S)\} \quad \text{[Equation 9]}$$

$$F = (S+P-1)^2/\{4 \times (S-1)^2\} \quad \text{[Equation 10]}$$

In Equations 6 to 10, P and S are values calculated using Equations 11 and 12 below.

$$P = P_{F,i}/P_{P,i} \quad \text{[Equation 11]}$$

$$S = P_{CO_2}^G / P_{N_2}^G \qquad \text{[Equation 12]}$$

In Equations 11 and 12, $P_{F,i}$ represents to a pressure (bar) in a pipe of the injection line of the area to be measured (i); $P_{P,i}$ represents a pressure (bar) in a pipe of the permeation line of the area to be measured (i); $P_{CO_2}^G$ represents $CO_2$ permeability (GPU) of the separation membrane in the area to be measured (i); and $P_{N_2}^G$ represents $N_2$ permeability (GPU) of the separation membrane in the area to be measured (i).

In addition, the $CO_2$ separation membrane plant abnormality detection system of the present invention may calculate the average $CO_2$ concentration (vol %) on the surface of the separation membrane ($C_{M,CO_2,i}$) in Equation 5 above using Equation 13 below.

In the related art, there are disadvantages in that, since it is extremely difficult to measure a value of the average $CO_2$ concentration ($C_{M,CO_2,i}$) on the surface of the separation membrane on site, and the value has to be calculated by separately measuring, for each separation membrane, the permeability, thickness, and the like of the separation membrane on an experimental level and then performing a complex computer operation in which the measured permeability, thickness, and the like are applied according to a configuration of the plant, it is not possible to predict result values of a change in an operation condition of the plant, and the complex computer operation has to be newly performed every time the condition is changed.

On the other hand, the $CO_2$ separation membrane plant abnormality detection system of the present invention may not only easily derive the average $CO_2$ concentration ($C_{M,CO_2,i}$) on the surface of the separation membrane, which is difficult to be measured, from the measured flow rates, $CO_2$ concentrations, and pressures using Equation 13 below, but also may provide calculated values which are very similar to results derived by actually performing a complex experiment.

In addition, the $CO_2$ separation membrane plant abnormality detection system of the present invention may address the uncertainty of a result following a change in an operation condition of the plant by Equations 4 to 12 above and Equation 13.

$$C_{M,CO_2,i} = \{(Q_{F,i}^m + P^n \cdot C_{F,CO_2,i}) \times C_{F,CO_2,i}\} / (Q_{F,i}^m + P^n) \qquad \text{[Equation 13]}$$

In Equation 13, $Q_{F,i}$ represents a flow rate ($Nm^3/hr$) in the injection line of the area to be measured (i), and $C_{F,i}$ represents a $CO_2$ concentration (vol %) in the injection line of the area to be measured (i).

In Equation 13, m and n are correction factors which may be obtained by fitting Equations 5 to 12 above to experimental and operational data. The fitting is a process of applying Equations 5 to 12 above to a graph of $CO_2$ concentration in the injection line and a graph of $CO_2$ concentration in the permeation line from operational data of the modules and the plant in order to obtain parameters that minimize an error between the two graphs. The m and n may be calculated using any program without limitation as long as the program provides a curve fitting function. For example, the m and n may be calculated by inputting values calculated using Equations 5 to 12 above to MATLAB, SigmaPlot, or the like.

In Equation 13, $Q_{F,i}^m$ is a value reflecting an increase in $CO_2$ on the surface of the separation membrane according to the flow rate and concentration of injected $CO_2$, and $P^n$ in the numerator is a value reflecting a change in time at which $CO_2$ comes in contact with the surface of the separation membrane as a volumetric flow rate of gas injected into each area changes due to a change in pressure. $P^n$ in the denominator is a correction term related to a flow rate of $CO_2$ remaining inside the module. $P^n$ and $C_{P,CO_2,i}$ are ratios, and $Q_{F,i}^m$ is a number having a unit of flow rate. However, since $Q_{F,i}^m$ is present in both the denominator and the numerator of Equation 13, $Q_{F,i}^m$ may be used in the form of a dimensionless coefficient.

FIGS. 4 to 7 are graphs showing comparisons between an average $CO_2$ concentration in the permeation unit calculated by an actual experiment and a predicted performance index value calculated from Equations 5 to 13 above. In each graph, the measured values and values calculated from Equations 5 to 13 show a similar trend to the experimental values. Thus, it is confirmed that relatively accurate performance prediction is possible using Equations 5 to 13.

When the fourth reference value calculated from Equation 4 is about 10% or less, it may be determined that an abnormal situation has occurred in an area other than the corresponding area to be measured (i). In this case, when the fourth reference value is calculated to be about 10% or less in all areas to be measured, a process may be performed in which a leakage site is detected in a pipe of a portion not directly connected to an area to be measured in the plant, the detected leakage site is repaired, and whether the plant has reached a normal state is confirmed.

Meanwhile, when the calculated fourth reference value exceeds about 10%, it may be determined that an abnormal situation has occurred in the corresponding area to be measured (i), and whether a disturbance has occurred in the corresponding area to be measured (i) may be examined.

Specifically, the examining of whether a disturbance has occurred in the area to be measured (i) may include, when one or more of a fifth reference value calculated using Equation 14 and a sixth reference value calculated using Equation 15 are about 10% or higher, determining that noise has occurred due to disturbance.

Fifth reference value={|($CO_2$ concentration measurement value of permeation line 10 seconds ago– current $CO_2$ concentration measurement value of permeation line)|/($CO_2$ concentration measurement value of permeation line 10 seconds ago)}×100 [Equation 14]

Sixth reference value={|(flow rate measurement value of permeation line 20 seconds ago–current flow rate measurement value of permeation line)|/(flow rate measurement value of permeation line 20 seconds ago)}×100 [Equation 15]

When, in the process of examining whether a disturbance has occurred in the area to be measured (i), it is determined that noise has occurred, the controller may re-perform calculation using Equation 1 above to calibrate the operation state of the plant.

When, in the process of examining whether a disturbance has occurred in the area to be measured (i), it is determined that noise has occurred, the controller may re-calculate the second reference value and the third reference value from Equations 2 and 3 above to calibrate the operation state of the plant.

When both the fifth reference value and the sixth reference value are less than about 10%, it may be determined that the area to be measured (i) is in an abnormal operation state, and the abnormal operation may be addressed by generating countermeasures. In this case, the above-described second reference value and third reference value may be utilized to propose a more specific plan for addressing the abnormal operation.

In a specific example, when both the fifth reference value and the sixth reference value are less than about 10%, the $CO_2$ concentration measured in the permeation unit is lower than the target $CO_2$ concentration (K), and the $CO_2$ capture rate in the permeation unit is higher than the target $CO_2$ capture rate (J), the $CO_2$ separation membrane plant abnormality detection system includes addressing an abnormal operation by checking whether a leak has occurred in a pipe connected to the corresponding area in which the abnormal operation is detected. The $CO_2$ capture rate in the permeation unit may be calculated using the equation $\{(Q_P \times C_{P.CO2})/(Q_{IN} \times C_{IN.CO2}) \times 100\}$.

In another specific example, when both the fifth reference value and the sixth reference value are less than about 10%, the $CO_2$ concentration measured in the permeation unit is equal to the target $CO_2$ concentration (K), and the $CO_2$ capture rate in the permeation unit is lower than the target $CO_2$ capture rate (J), the $CO_2$ separation membrane plant abnormality detection system may include addressing an abnormal operation by checking whether a leak has occurred in pipes connected to the entrance unit, the permeation unit, and the residue unit of the plant and whether a valve of each pipe is open.

In still another specific example, when both the fifth reference value and the sixth reference value are less than about 10%, the $CO_2$ concentration measured in the permeation unit is higher than the target $CO_2$ concentration (K), and the $CO_2$ capture rate in the permeation unit is lower than the target $CO_2$ capture rate (J), the $CO_2$ separation membrane plant abnormality detection system may include addressing an abnormal operation by checking whether re-circulation from a $CO_2$ removing gas discharge pipe connected to the corresponding area in which the abnormal operation is detected is performed in a normal state (whether recycling is performed in a normal state).

When both the fifth reference value and the sixth reference value are less than about 10%, the $CO_2$ concentration measured in the permeation unit is higher than the target $CO_2$ concentration (K), and the $CO_2$ capture rate in the permeation unit is higher than the target $CO_2$ capture rate (J), the $CO_2$ separation membrane plant abnormality detection system may include addressing an abnormal operation by checking whether the measurer configured to measure flow rates and $CO_2$ concentrations in each of the entrance unit, the permeation unit, and the residue unit is in a normal state.

FIG. 1 illustrates a illustratively flowchart of a $CO_2$ separation membrane plant abnormality detection system according to an embodiment of the present invention. This is merely an example, and content of the present invention is not limited thereto.

Referring to FIG. 1, the illustrative $CO_2$ separation membrane plant abnormality detection system of the present invention measures flow rates and $CO_2$ concentrations by a measurer (S10) and collects the measured flow rates and $CO_2$ concentrations.

The collected information is transmitted to the controller and used in calculating the first reference value using Equation 1 described above to determine whether the plant is in an abnormal operation state (S11).

In the determination process, when the first reference value is about 95% or higher, the $CO_2$ separation membrane plant abnormality detection system determines an operation state of the plant by using the second reference value calculated using Equation 2 and the third reference value calculated using Equation 3 (S12) and checks whether target values are achieved by the plant operation.

When a value calculated using the first reference value is less than 95% and thus it is determined that the plant is in an abnormal operation state, determining whether the plant is in the abnormal operation state using the second reference value and the third reference value may be omitted, and countermeasures for addressing the abnormal operation may be immediately performed.

In this case, appropriate countermeasures may be detecting and repairing a leakage site of the entire pipe included in the plant and checking whether the plant has reached a normal state (S17).

When both the second reference value and the third reference value are less than set values designated by the user and thus are normal, the system may determine that an operation situation of the plant is normal and re-calculate the first to third reference values at an interval of five minutes to thirty minutes to periodically monitor the $CO_2$ separation membrane plant (S13).

Meanwhile, when one or more of the second reference value calculated using Equation 2 and the third reference value calculated using Equation 3 exceed set values designated by the user, the system determines that the operation state of the plant is abnormal. In such a case, the plant may be divided into a certain number of areas to determine the presence of an abnormality by area (S14).

The determining of the presence of an abnormality by area (S14) is performed by the fourth reference value calculated using Equation 4 above. When the calculated fourth reference value is about 10% or less, it may be determined that an abnormal situation has occurred in an area other than the corresponding area to be measured. In this case, when the fourth reference value is calculated to be about 10% or less in all areas to be measured, a process may be performed in which a leakage site is detected in a pipe of a portion not directly connected to an area to be measured in the plant, the detected leakage site is repaired, and whether the plant has reached a normal state is confirmed.

Meanwhile, when the calculated fourth reference value exceeds about 10%, it may be determined that an abnormal situation has occurred in a portion of the corresponding area, and whether a disturbance has occurred in the corresponding area is examined (S15). Whether the disturbance has occurred is determined by calculating the fifth reference value and the sixth reference value using Equations 14 and 15 above.

When the state in which noise has occurred in which the fifth reference value or sixth reference value exceeds about 10% is detected in the examining of whether the disturbance has occurred (S15), the controller may calibrate the operation state of the plant (S18) by performing re-calculation using Equations 2 and 3 described above.

When the state in which noise has not occurred in which both the fifth reference value and the sixth reference value are about 10% or less is confirmed in the examining of whether the disturbance has occurred (S15), the system may utilize the measured information to deal with an abnormal operation (S16) by replacing a module in the corresponding area, replacing a separation membrane, checking whether a leak has occurred in a pipe, changing an operation condition of the plant, and the like.

The configuration and action of the present invention will be described in more detail below using preferred embodiments of the present invention. However, the embodiments below are merely provided as preferred examples of the present invention, and the present invention is not limitedly interpreted in any way by the embodiments below.

[Modes of the Invention]

EXAMPLES

Examples 1 to 5

After configuring a $CO_2$ separation membrane plant as illustrated in FIG. 2, measured variables were fitted using the above-described Equations 5 to 13 of the present invention through the MATLAB program, and 1.74 and 2.37 were obtained as m and n of Equation 13, respectively. Also, while changing flow rates and pressures in the plant as shown in Table 1 below, changes in $CO_2$ concentration in the permeation unit due to the changes in the flow rates and pressures were predicted and shown using graphs in FIGS. 4 to 7.

TABLE 1

| Variable  | Flow rate (NL/min) | Pressure (bar) |
|-----------|--------------------|----------------|
| Example 1 | 70                 | 1              |
| Example 2 | 70                 | 1.5            |
| Example 3 | 70                 | 2              |
| Example 4 | 50                 | 2              |
| Example 5 | 88                 | 2              |

Comparative Examples 1 to 5

After configuring a $CO_2$ separation membrane plant as illustrated in FIG. 2, while changing flow rates and pressures in the plant as shown in Table 2 below, changes in $CO_2$ concentration in the permeation unit due to the changes in the flow rates and pressures were actually measured and shown using graphs in FIGS. 4 to 7.

TABLE 2

| Variable              | Flow rate (NL/min) | Pressure (bar) |
|-----------------------|--------------------|----------------|
| Comparative Example 1 | 70                 | 1              |
| Comparative Example 2 | 70                 | 1.5            |
| Comparative Example 3 | 70                 | 2              |
| Comparative Example 4 | 50                 | 2              |
| Comparative Example 5 | 88                 | 2              |

As it can be seen from FIGS. 4 to 7, the $CO_2$ concentrations in the permeation unit in Comparative Examples 1 to 5 which are calculated through an actual experiment show a similar trend to the predicted performance index curves of Examples 1 to 5 calculated from Equations 5 to 13 of the present invention. Thus, it is confirmed that relatively accurate performance prediction is possible using Equations 5 to 13.

In addition, while Comparative Examples 1 to 5 cause an inconvenience of having to conduct an experiment in order to derive each value, Examples 1 to 5 of the present invention provide result values in the form of a predicted performance index curve using Equations 5 to 13, thereby having an effect of predicting and providing changes in the operation efficiency due to changes in the variables using measured values.

DESCRIPTION OF REFERENCE NUMERALS

100: entrance unit
200: permeation unit
300: residue unit
10: first module
11: first-first module
12: first-second module
13: first-third module
20: second module
30: third module

The invention claimed is:

1. A system for detecting an abnormality in a carbon dioxide ($CO_2$) separation membrane plant, the system including:
an entrance unit through which gas containing $CO_2$ enters a plant including a $CO_2$ separation membrane module;
a separation membrane module which includes an injection port supplying the gas containing $CO_2$ to each $CO_2$ separation membrane module and is configured to cause the supplied gas to permeate through the $CO_2$ separation membrane and separately discharge gas with a relatively high $CO_2$ concentration that has permeated through the separation membrane to a first discharge port and gas with a relatively low $CO_2$ concentration that has failed to permeate through the separation membrane to a second discharge port;
a permeation unit configured to discharge the gas with the relatively high $CO_2$ concentration, which is discharged from the separation membrane module, to the outside of the plant;
a residue unit configured to discharge the gas with the relatively low $CO_2$ concentration, which is discharged from the separation membrane module, to the outside of the plant;
a measurer configured to measure information including a flow rate, a $CO_2$ concentration, and a pressure in the entrance unit, the permeation unit, and the residue unit; and
a controller configured to determine the presence of an abnormality from the information collected by the measurer, wherein:
when a first reference value calculated using Equation 1 below is about less than 95%, the controller detects an operation situation of the plant as an abnormal situation; and
when the first reference value calculated using Equation 1 is about 95% or higher, the controller calculates a second reference value and a third reference value from Equations 2 and 3 below to determine an operation state of the plant:

$$\text{First reference value} = [\{(Q_P \times C_{P,CO2}) + (Q_R \times C_{R,CO2})\} / (Q_{IN} \times C_{IN,CO2})] \times 100 \quad \text{[Equation 1]}$$

$$\text{Second reference value} = |J - \{(Q_P \times C_{P,CO2}) / (Q_{IN} \times C_{IN,CO2}) \times 100\}| \quad \text{[Equation 2]}$$

$$\text{Third reference value} = |K - C_{P,CO2}|, \quad \text{[Equation 3]}$$

wherein, in Equations 1 to 3:
$Q_{IN}$ represents a flow rate ($Nm^3/hr$) of the gas containing $CO_2$ that enters the plant through the entrance unit;
$Q_P$ represents a flow rate ($Nm^3/hr$) of the gas discharged to the permeation unit;
$Q_R$ represents a flow rate ($Nm^3/hr$) of the gas discharged to the residue unit;
$C_{IN,CO2}$ represents a $CO_2$ concentration (vol %) in the entrance unit;
$C_{P,CO2}$ represents a $CO_2$ concentration (vol %) of the gas discharged to the permeation unit;
$C_{R,CO2}$ represents a $CO_2$ concentration (vol %) of the gas discharged to the residue unit;
J represents a target $CO_2$ capture rate (%); and
K represents a target $CO_2$ concentration (vol %).

2. The system of claim 1, wherein, when the first reference value calculated using Equation 1 is about less than 95%, the controller detects an operation situation of the plant as an abnormal situation and checks whether a leak has occurred in a pipe of the plant and whether the plant has reached a normal state.

3. The system of claim 1, wherein, when both the second reference value calculated using Equation 2 and the third reference value calculated using Equation 3 are less than or equal to set values designated by a user, the controller re-calculates the first reference values at an interval of about five minutes to thirty minutes.

4. The system of claim 1, wherein, when one or more of the second reference value calculated using Equation 2 and the third reference value calculated using Equation 3 exceed set values designated by the user, the controller divides the whole plant into two or more areas and then calculates a fourth reference value, which is based on Equation 4 below, for each area to determine whether an abnormal situation has occurred by area:

$$\text{Fourth reference value} = \{|(C_{PV,i} - C_{P.CO2,i})|/C_{P.CO2,i}\} \quad \text{[Equation 4]}$$

wherein, in Equation 4, $C_{PV,i}$ represents a $CO_2$ concentration (vol %) measured in the permeation line of an area to be measured (i), and $C_{P.CO2,i}$ represents a predicted value of a $CO_2$ concentration in the permeation line of the area to be measured that is calculated using Equation 5 below:

$$C_{P.CO2,i} = A \times C_{M.CO2,i} + B - \{D \times (C_{M.CO2,i})^2 + E \times C_{M.CO2,i} + F\}^{0.5} \quad \text{[Equation 5]}$$

wherein, in Equation 5, $C_{M.PCO2,i}$ represents an average $CO_2$ concentration (vol %) on a surface of a separation membrane in the area to be measured (i), and A, B, D, E, and F are constants calculated by Equations 6 to 10 below:

$$A = P/2 \quad \text{[Equation 6]}$$

$$B = (S+P-1)/\{2 \times (S-1)\} \quad \text{[Equation 7]}$$

$$D = P^2/4 \quad \text{[Equation 8]}$$

$$E = \{P \times (S-P+1)\}/\{2 \times (1-S)\} \quad \text{[Equation 9]}$$

$$F = (S+P-1)^2/\{4 \times (S-1)^2\} \quad \text{[Equation 10]}$$

wherein, in Equations 6 to 10, P and S are values respectively calculated using Equations 11 and 12 below:

$$P = P_{F,i}/P_{P,i} \quad \text{[Equation 11]}$$

$$S = P_{CO2}^G/P_{N2}^G, \quad \text{[Equation 12]}$$

wherein, in Equations 11 and 12:
$P_{F,i}$ represents to a pressure (bar) in a pipe of the injection line of the area to be measured (i);
$P_{P,i}$ represents a pressure (bar) in a pipe of the permeation line of the area to be measured (i);
$P_{CO2}^G$ represents $CO_2$ permeability (GPU) of the separation membrane in the area to be measured (i); and
$P_{N2}^G$ represents $N_2$ permeability (GPU) of the separation membrane in the area to be measured (i).

5. The system of claim 4, wherein, when the fourth reference value is about 10% or less, the controller checks whether a leak has occurred in a pipe of the plant and whether the plant has reached a normal state.

6. The system of claim 4, wherein, when the fourth reference value exceeds about 10%, the controller determines that the area to be measured (i) is in an abnormal operation state and examines whether a disturbance has occurred therein.

7. The system of claim 6, wherein the examining of whether a disturbance has occurred includes, when one or more of a fifth reference value calculated using Equation 14 below and a sixth reference value calculated using Equation 15 below are about 10% or higher, determining that noise has occurred due to a disturbance:

Fifth reference value={|($CO_2$ concentration measurement value of permeation line 10 seconds ago−current $CO_2$ concentration measurement value of permeation line)|/($CO_2$ concentration measurement value of permeation line 10 seconds ago)}×100 [Equation 14]

Sixth reference value={|(flow rate measurement value of permeation line 20 seconds ago−current flow rate measurement value of permeation line)|/(flow rate measurement value of permeation line 20 seconds ago)}×100 [Equation 15].

8. The system of claim 7, wherein, when, in the process of examining whether a disturbance has occurred in the area to be measured (i), it is determined that noise has occurred due to a disturbance, the controller re-calculates the second reference value and the third reference value from Equations 2 and 3.

9. The system of claim 8, wherein, when both the fifth reference value and the sixth reference value are about less than 10%, the controller determines that the area to be measured (i) is in an abnormal operation state and generates countermeasures.

10. The system of claim 9, wherein, when the $CO_2$ concentration measured in the permeation unit of the plant is lower than the target $CO_2$ concentration (K), and the $CO_2$ capture rate in the permeation unit is higher than the target $CO_2$ capture rate (J), the countermeasures include addressing an abnormal operation by checking whether a leak has occurred in a pipe connected to the corresponding area in which the abnormal operation is detected,
wherein the $CO_2$ capture rate in the permeation unit is calculated using the equation $\{(Q_P \times C_{P.CO2})/(Q_{IN} \times C_{IN.CO2}) \times 100\}$.

11. The system of claim 9, wherein, when the $CO_2$ concentration measured in the permeation unit is equal to the target $CO_2$ concentration (K), and the $CO_2$ capture rate in the permeation unit is lower than the target $CO_2$ capture rate (J), the countermeasures include addressing an abnormal operation by checking whether a leak has occurred in pipes connected to the entrance unit, the permeation unit, and the residue unit of the plant and whether a valve of each pipe is open,
wherein the $CO_2$ capture rate in the permeation unit is calculated using the equation $\{(Q_P \times C_{P.CO2})/(Q_{IN} \times C_{IN.CO2}) \times 100\}$.

12. The system of claim 9, wherein, when the $CO_2$ concentration measured in the permeation unit is higher than the target $CO_2$ concentration (K), and the $CO_2$ capture rate in the permeation unit is lower than the target $CO_2$ capture rate (J), the countermeasures include addressing an abnormal operation by checking whether re-circulation from a $CO_2$ removing gas discharge pipe connected to the corresponding area in which the abnormal operation is detected is performed in a normal state,
wherein the $CO_2$ capture rate in the permeation unit is calculated using the equation $\{(Q_P \times C_{P.CO2})/(Q_{IN} \times C_{IN.CO2}) \times 100\}$.

13. The system of claim 9, wherein, when the $CO_2$ concentration measured in the permeation unit is higher than the target $CO_2$ concentration (K), and the $CO_2$ capture rate in the permeation unit is higher than the target $CO_2$ capture rate (J), the countermeasures include addressing an abnormal operation by checking whether the measurer configured to measure flow rates and $CO_2$ concentrations in each of the entrance unit, the permeation unit, and the residue unit is in a normal state, wherein the $CO_2$ capture rate in the permeation unit is calculated using the equation $\{(Q_P \times C_{P.CO2})/(Q_{IN} \times C_{IN.CO2}) \times 100\}$.

\* \* \* \* \*